United States Patent [19]
Lindquist

[11] 3,861,077
[45] Jan. 21, 1975

[54] TOY FOR PRODUCING WRITTEN DESIGNS ON PAPER

[75] Inventor: Robert Lindquist, Burlington, Vt.

[73] Assignee: The Raymond Lee Organization, Inc., New York, N.Y.

[22] Filed: Aug. 29, 1973

[21] Appl. No.: 392,457

[52] U.S. Cl. .................... 46/65, 46/73, 33/27 L
[51] Int. Cl. .............................................. A63h 1/00
[58] Field of Search .................. 46/64–73, 50, 46/49; 33/27 L; 35/19 R

[56] References Cited
UNITED STATES PATENTS

| | | | |
|---|---|---|---|
| 215,458 | 5/1879 | Jones | 46/64 |
| 1,235,050 | 7/1917 | Pajeau | 35/19 R |
| 1,265,644 | 5/1918 | Frederick | 46/66 |
| 2,332,507 | 10/1943 | Dailey | 46/64 X |
| 3,083,498 | 4/1963 | Kelley | 46/65 |

FOREIGN PATENTS OR APPLICATIONS 736,317  9/1932  France ........................ 46/64

*Primary Examiner*—Harry N. Haroian

[57] ABSTRACT

A vertical writing instrument has a downwardly disposed writing end. A hub is secured to the instrument at a position above but adjacent the writing end just below the vertical balance point. At least one circular horizontal disc is secured to the hub and is centered on the instrument. A weight is secured to the disc at an off center position. The weight can be moved back and forth to any position along a radius.

2 Claims, 3 Drawing Figures

PATENTED JAN 21 1975　　　　　　　　　　　　3,861,077

TOY FOR PRODUCING WRITTEN DESIGNS ON PAPER

My invention is directed toward a toy which employs the principle of the top to create many different interesting designs on a piece of paper. For reasons which will become apparent hereinafter, I call my toy a spasmospinner.

To this end, a vertical writing instrument such as a ball point pen or pencil is disposed with writing end downward. A hub is secured to the instrument at a position above but adjacent the writing end just below the vertical balance point.

At least one circular horizontal disc centered on the instrument is secured to the hub. A weight is secured to the disc at an off center position.

In use the toy is spun like a top with the writing end being dropped on a piece of paper. The toy then dances around producing variable and intriguing designs which utilize a spiralling line. The width of the line can be varied by shifting the position of the weight.

DETAILED DESCRIPTION OF PREFERRED EMBODIMENTS

Figure 1:
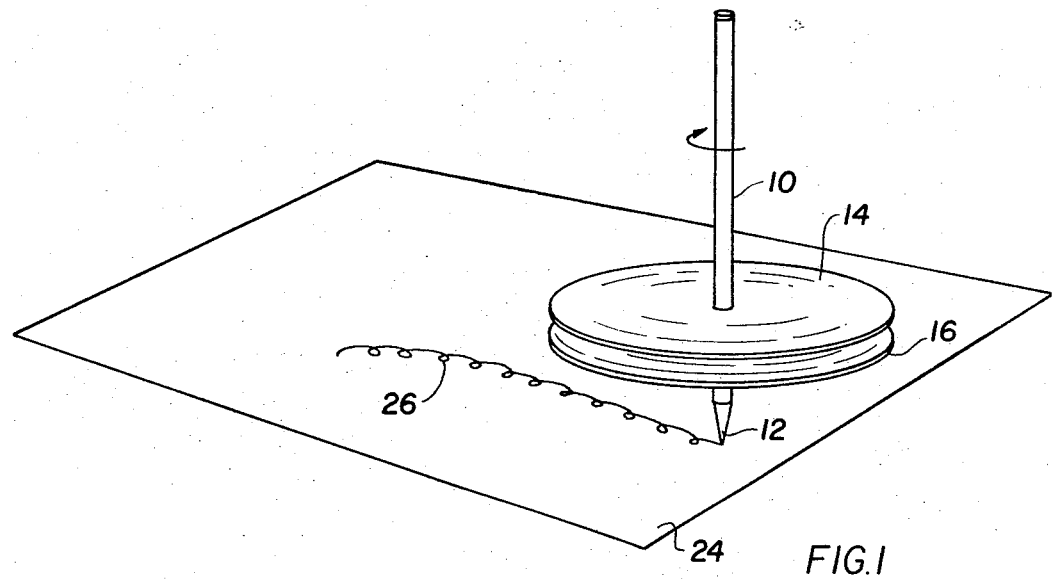
FIG. 1 is a perspective view of my toy in use.
Figure 2:
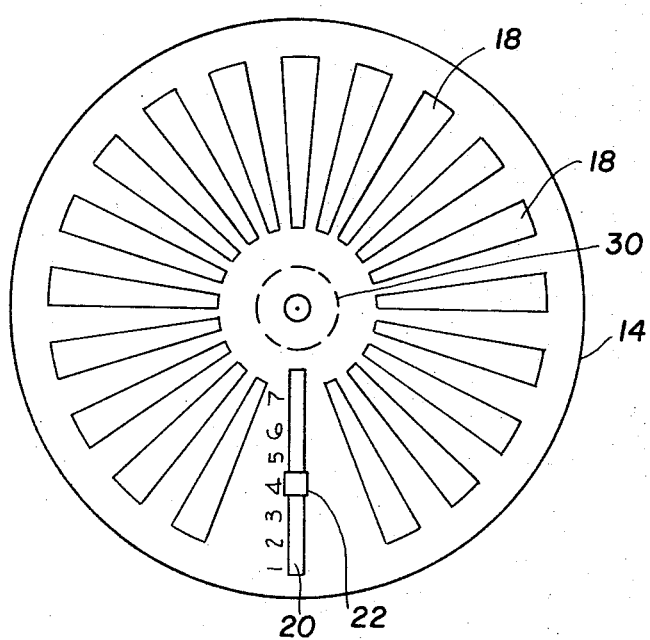
FIG. 2 is a top view of my toy.
Figure 3:
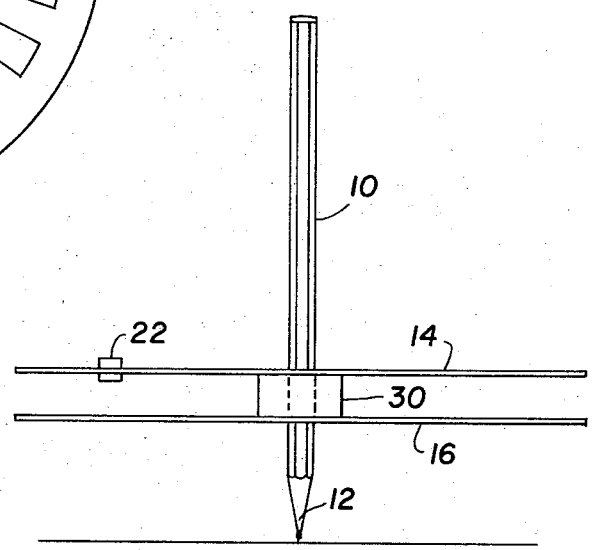
FIG. 3 is a side view of my toy.

Referring now to FIGS. 1–3, a vertically elongated writing instrument 10 such as a ball point pen or pencil has a downwardly disposed writing end or tip 12.

A solid plastic hub 30 is secured to and centered on the instrument being disposed adjacent the end 12 at a point just below the vertical balance point.

First and second horizontal circular discs 14 and 16 of like plastic material, thickness and diameter centered on the instrument, are secured to opposite ends of the hub and are thus vertically spaced. These discs have slots or vents 18, typically having sector like shapes, cut therein.

The upper disc 14 has a radial slot 20 disposed therein. A weight 22 is slidably disposed in the slot 20 and can be moved back and forth therein to any desired position.

When the device is spun like a top and dropped upon a piece of paper 24 in such manner that the tip falls through a distance of about an inch, written designs 26 are produced on the paper.

The weight of the hub bears upon the tip to produce a clear writing pattern. The lines produced are spiral in form since the device spins around its axis as it wobbles due to the weight. The diameter of the spiral increases as the weight is moved outward along the radial slot.

Typically the discs are five inches in diameter and are separated by one half inch. The hub can be about one inch in diameter. The vents can be spaced about one quarter inch apart and can have an average width of about the same amount to serve materials and enhance design and balance. Of course, other dimensions can be used.

While I have described my invention with particular reference to the drawings, such is not to be considered as limiting its actual scope.

Having thus described this invention, what is asserted as new is:

1. A toy comprising:
   a vertical writing instrument having a downwardly disposed writing end;
   a hub secured to the instrument in a position above but adjacent the writing end just above the vertical balance point, said hub having upper and lower vertically spaced ends;
   a first circular horizontal disc secured to the upper end of the hub and centered on said instrument, said first disc having a radially disposed slot;
   a weight slidable in said slot;
   means securing said weight to said first disc in any off-center position in said slot; and
   a second horizontal circular disc of like dimensions to the first disc, said second disc being secured to the lower end of the hub and centered on said instrument.
2. The toy of claim 1 wherein both discs have sector like slots cut therein.

* * * * *